US012627198B2

(12) United States Patent
Hsu et al.

(10) Patent No.: US 12,627,198 B2
(45) Date of Patent: May 12, 2026

(54) DAMPER DEVICE AND ELECTRONIC APPARATUS

(71) Applicant: Lanto Electronic Limited, Kunshan City (CN)

(72) Inventors: Chia-Ching Hsu, Kunshan City (CN); Fu Yuan Wu, Kunshan City (CN); Shang Yu Hsu, Kunshan City (CN); Shao Chung Chang, Kunshan City (CN); Meng Ting Lin, Kunshan City (CN); Chun Kai Chen, Kunshan City (CN)

(73) Assignee: LANTO ELECTRONIC LIMITED, Kunshan City (CN)

( * ) Notice: Subject to any disclaimer, the term of this patent is extended or adjusted under 35 U.S.C. 154(b) by 413 days.

(21) Appl. No.: 18/503,613

(22) Filed: Nov. 7, 2023

(65) Prior Publication Data

US 2024/0305162 A1 Sep. 12, 2024

(30) Foreign Application Priority Data

Mar. 6, 2023 (CN) .......................... 202310204179.1
Sep. 5, 2023 (CN) .......................... 202322407527.3

(51) Int. Cl.
| | |
|---|---|
| *H04N 5/232* | (2006.01) |
| *F16F 15/02* | (2006.01) |
| *H02K 5/24* | (2006.01) |
| *H02K 41/035* | (2006.01) |

(52) U.S. Cl.
CPC ............... *H02K 5/24* (2013.01); *F16F 15/02* (2013.01); *H02K 41/0354* (2013.01)

(58) Field of Classification Search
CPC .. H02K 5/24; H02K 41/0354; H02K 41/0356; F16F 15/02; F16F 9/006; F16F 9/103; F16F 9/30
See application file for complete search history.

(56) References Cited

U.S. PATENT DOCUMENTS

| | | | |
|---|---|---|---|
| 7,956,602 B2 * | 6/2011 | Kasajima | ................. G01C 9/06 324/207.13 |
| 10,715,730 B1 * | 7/2020 | Xu | .......................... H04N 23/67 |
| 2017/0216885 A1 * | 8/2017 | Takeda | .................. H01F 7/1615 |
| 2018/0083521 A1 * | 3/2018 | Takeda | ................... H02K 15/00 |

FOREIGN PATENT DOCUMENTS

| | | |
|---|---|---|
| CN | 111555537 A | 8/2020 |
| CN | 116181842 A | 5/2023 |
| JP | H0643383 U | 6/1994 |
| TW | M647882 U | 11/2023 |

* cited by examiner

*Primary Examiner* — Amy J. Sterling
(74) *Attorney, Agent, or Firm* — MUNCY, GEISSLER, OLDS & LOWE, P.C.

(57) ABSTRACT

A damper device and an electronic apparatus are provided. The damper device includes a first holder, a first damper component and a first gel. The first damper component includes a first protrusion part and a first bar part. The first protrusion part includes a first surface. The first bar part includes a first free end and a first fixed end. The first protrusion part is fixed on the first free end, the first fixed end is fixed on the first holder and the first surface protrudes outward from the first free end. The first free end and the first protrusion part are inserted into the first gel, and the first gel moves along the radial direction of the first bar part relative to the first bar part.

15 Claims, 6 Drawing Sheets

DAMPER DEVICE AND ELECTRONIC APPARATUS

FIELD OF THE INVENTION

The present disclosure relates to a technical field of dampers, and particularly relates to a damper device and an electronic apparatus.

BACKGROUND OF THE INVENTION

During work, a micro motion mechanism (e.g., voice coil motor) would generate unnecessary motion after the micro motion mechanism undergoes external stimulation or external interference (e.g., shaking). In order to reduce the effect of the external interference which the micro motion mechanism undergoes, a damper may be disposed in the micro motion mechanism to lower the frequency response of the micro motion mechanism to the external interference.

For example, the damper may include a damping pin and a gel. One end of the damping pin is fixed, and the other end of the damping pin may move in the gel along the radial direction of the damping pin. The damping pin moves in the gel and remains bonding to the gel to lower the frequency response of the micro motion mechanism to the external interference.

The shape of the common damping pin is a long rectangular parallelepiped or a cylinder. When the damping pin moves in the gel, the torque rotating the bottom of the damping pin is generated. Under the interaction of the torque, the damping pin squeezes the gel so that the gel is deformed. After the damping pin moves in the gel many times, a gap is generated between the damping pin and the gel. Because of the gap between the damping pin and the gel, the contact area of the damping pin and the gel would be reduced so that the bonding force between the damping pin and the gel is reduced and the damping pin is easily detached from the gel. Hence, the existing damping pin has a problem that the bonding force between the damping pin and the gel is reduced and the damping pin is easily detached from the gel after the damping pin moves in the gel many times.

SUMMARY OF THE INVENTION

The object of the present disclosure is to provide a damper device which has an advantage that the first damper component is not easily detached from the first gel because the bonding force between the first damper component and the first gel is reduced. The damper device includes a first holder, a first damper component and a first gel. The first damper component includes a first protrusion part and a first bar part. The first protrusion part includes a first surface. The first bar part includes a first free end and a first fixed end. The first protrusion part is fixed on the first free end, the first fixed end is fixed on the first holder and the first surface protrudes outward from the first free end. The first free end and the first protrusion part are inserted into the first gel, and the first gel moves along the radial direction of the first bar part relative to the first bar part.

In some embodiments, the shape of the first protrusion part is a column.

In some embodiments, the side surface of the first protrusion part is fixed on the first free end.

In some embodiments, the first bar part includes two side planes. The two end surfaces of the first protrusion part and the two side planes of the first bar part are disposed with coplanarity.

In some embodiments, the area of the end surface of the first protrusion part on one side of the first bar part is greater than the area of the end surface of the first protrusion part on another side of the first bar part.

In some embodiments, the area of the end surface of the first protrusion part on one side of the first bar part is equal to the area of the end surface of the first protrusion part on another side of the first bar part.

In some embodiments, the first holder includes a first supporting bar and a first supporting plate. One end of the first supporting bar is fixed on the first supporting plate and the first fixed end is fixed on another end of first supporting bar.

In some embodiments, the number of the first supporting bars is two, and the two first supporting bars are fixed on the first supporting plate.

In some embodiments, the number of the first bar parts is two and the two first bar parts are disposed in parallel with each other. The number of the first protrusion parts is two and the two end surfaces of the two first protrusion parts are disposed with coplanarity. Each of the two first supporting bars corresponds to one of the two first bar parts and is fixed on the corresponding first bar part, and each of the two first bar parts corresponds to one of the two first protrusion parts and is fixed on the corresponding first protrusion part.

In some embodiments, the damper device further includes a first frame and a first motion component. The first motion component moves along the radial direction of the first bar part relative to the first frame, the first holder is fixed on the first frame, and the first gel is disposed on the first motion component.

In some embodiments, the number of the first holders is two, and the first motion component is disposed between the two first holders.

In some embodiments, the damper device further includes a second holder, a second damper component and a second gel. The second damper component includes a second protrusion part and a second bar part. The second protrusion part includes a second surface. The second bar part includes a second fixed end and a second free end. The second fixed end is fixed on the second holder, the second protrusion part is fixed on the second free end and the second surface protrudes outward from the second free end. The second free end and the second protrusion part are inserted into the second gel. The second bar part moves along the radial direction of the second bar part relative to the second gel.

In some embodiments, the second holder includes a second supporting bar and a second supporting plate. One end of the second supporting bar is fixed on the second supporting plate and the second fixed end is fixed on another end of second supporting bar.

In some embodiments, the damper device further includes a second frame and a second motion component. The second motion component moves along the radial direction of the second bar part relative to the second frame, the second holder is fixed on the second motion component, and the second gel is disposed on the second frame.

The present disclosure provides an electronic apparatus including the aforementioned damper device.

The present disclosure discloses: the first holder, the first damper component and the first gel. The first damper component includes the first protrusion part and the first bar part. The first protrusion part includes the first surface. The first bar part includes the first free end and the first fixed end. The first protrusion part is fixed on the first free end, the first fixed end is fixed on the first holder and the first surface protrudes outward from the first free end. The first free end and the first protrusion part are inserted into the first gel, and the first gel moves along the radial direction of the first bar part relative to the first bar part. Because the first free end and the first protrusion part are inserted into the first gel and may move in the first gel and the first fixed end is fixed on the first holder, the first damper component generates the distributed torque rotating the bottom of the first free end on the first gel when the first gel moves along the radial direction of the first bar part relative to the first bar part.

In comparison with the straight damping pin without the first surface, the contact area of the first surface and the first gel is increased so that the total contact area of the first damper component and the first gel is larger. Hence, under the same interaction of the distributed torque, the gap generated between the first damper component and the first gel is smaller so that the reduction of the bonding force between the first damper component and the first gel would be reduced and the first damper component is not easily detached from the first gel.

The aforementioned description of the present disclosure is merely the outline of the technical solutions of the present disclosure. In order to understand the technical solutions of the present disclosure clearly and to implement the present disclosure according to the content of the specification. The better embodiments of the present disclosure given herein below with accompanying drawings are used to describe the present disclosure in detail.

THE DRAWINGS

DETAILED DESCRIPTION

The specific embodiments of the present disclosure given herein below is used to explain the implementation of the present disclosure. A person skilled in the art easily understands the advantages and the effects of the present disclosure from the content of the present disclosure.

It should be noted that the embodiments and the features in the embodiments of the present disclosure can be combined with each other without conflict. The present disclosure will be described in detail below with reference to accompanying drawings and in conjunction with the embodiments. In order to provide those in the art with better understanding of the solution of the disclosure, the technical solutions in the embodiments of the present disclosure will be described clearly and completely below in conjunction with the accompanying drawings in the embodiments of the present disclosure. Apparently, the described embodiments are merely one part of the embodiments of the present disclosure and not all embodiments of the present disclosure. Based on the embodiments of the present disclosure, all other embodiments obtained by a person skilled in the art shall fall within the scope of protection of the present disclosure.

It should be noted that the terms "first", "second", etc. in the specification and claims of the present disclosure and in the aforementioned accompanying drawings are used to distinguish similar objects and need not be used to describe a particular order or sequence. Furthermore, the terms "comprising" and "having", and any variation thereof, are intended to encompass a non-exclusive inclusion, for example, a series of steps or units comprising processes, methods, systems, products or equipment need not be limited to those steps or units clearly listed but may include other steps or units not clearly listed or inherent to those processes, methods, products or equipment.

It should be noted that the terms "mount", "connect", "link" should be broadly interpreted, for example, may be a permanent connection, may be a dismountable connection or may be an integral connection; may be a mechanical connection or may be an electrically connection; may be a direct connection, may be a connection by intermediate mediums, or may be an interior connection between two components. For a person skilled in the art, the meaning of the aforementioned terms in the present disclosure may be understood upon specific situations.

Figure 1:
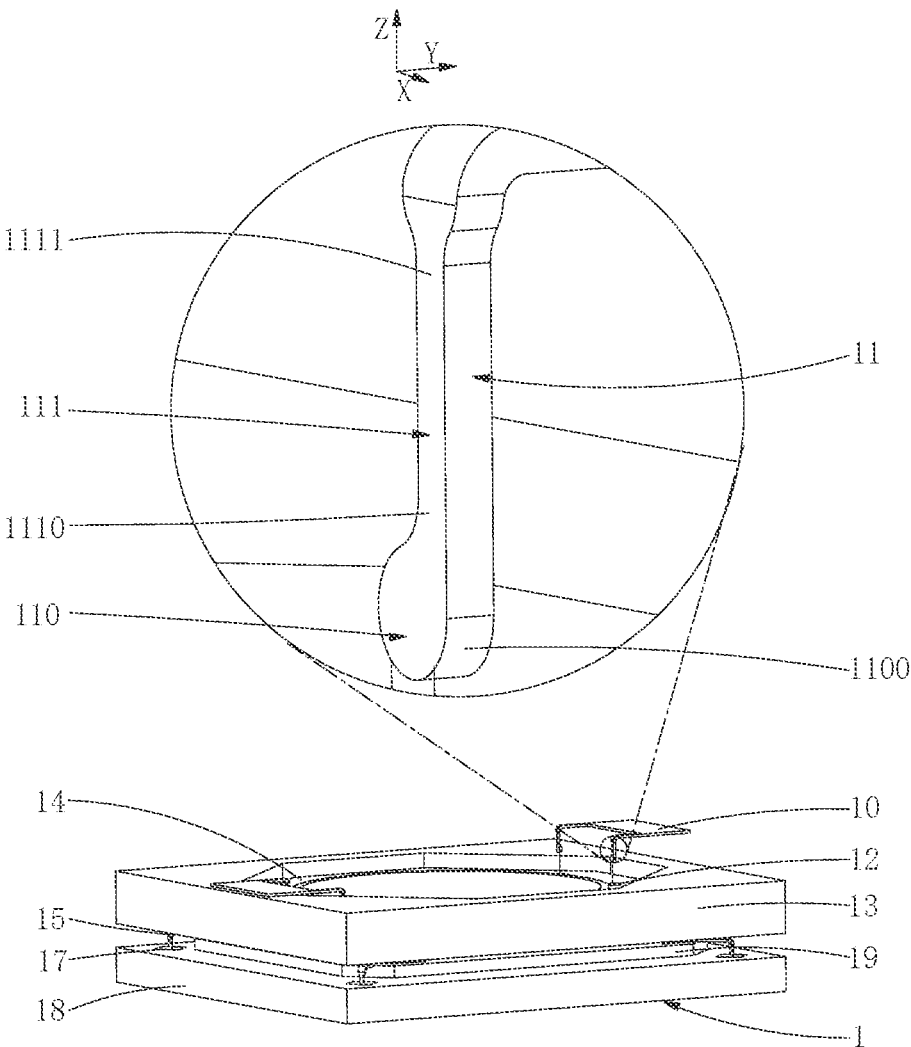
FIG. 1 is a 3D diagram and a partial enlarged diagram of a damper device according to one embodiment of the present disclosure (one first holder is on a separate state).

As shown in FIG. 1, the present disclosure in one embodiment provides a damper device 1 and the damper device 1 may be one part of a micro motion mechanism (e.g., voice coil motor). The damper device 1 includes a first holder 10, a first damper component 11 and a first gel 12. The first damper component 11 includes a first protrusion part 110 and a first bar part 111. The first protrusion part 110 includes a first surface 1100. The first bar part 111 includes a first free end 1110 and a first fixed end 1111. The first protrusion part 110 is fixed on the first free end 1110, the first fixed end 1111 is fixed on the first holder 10 and the first surface 1100 protrudes outward from the first free end 1110. The first free end 1110 and the first protrusion part 110 are inserted into the first gel 12, and the first gel 12 moves along the radial direction of the first bar part 111 relative to the first bar part 111.

As shown in FIG. 1, for convenience to explain, Cartesian coordinate system O-xyz may be disposed in the damper device 1 such that the axial direction of the first bar part 111 and the axial direction of the second bar part 161 (the second bar part 161 may refer to FIG. 10) are parallel to z-axis of the Cartesian coordinate system O-xyz. The first gel 12 may be a damping gel. The shape of the first protrusion part 110 may be a sphere, a ellipsoid, a cuboid or a column in the following embodiment. The first surface 1100 may be merely a circular arc surface, a protrusion mixed by a circular arc surface and a plane or a protrusion formed by a plurality of planes. The first surface 1100 may protrude outward along x-axis, y-axis or z-axis. The shape of the first bar part 111 is a long rectangular parallelepiped or a cylinder. The first free end 1110 may move freely in the first gel 12, and for example, the first free end 1110 may move in the first gel 12 along the direction parallel to x-axis or y-axis. The first fixed end 1111 represents that one end of the first bar part 111 is fixed on the first holder 10, and in other words, the first fixed end 1111 could not move relative to the first holder 10. The first damper component 11 and the first holder 10 may be integrally formed. The first bar part 111 and the first protrusion part 110 may be integrally formed.

Figure 2:
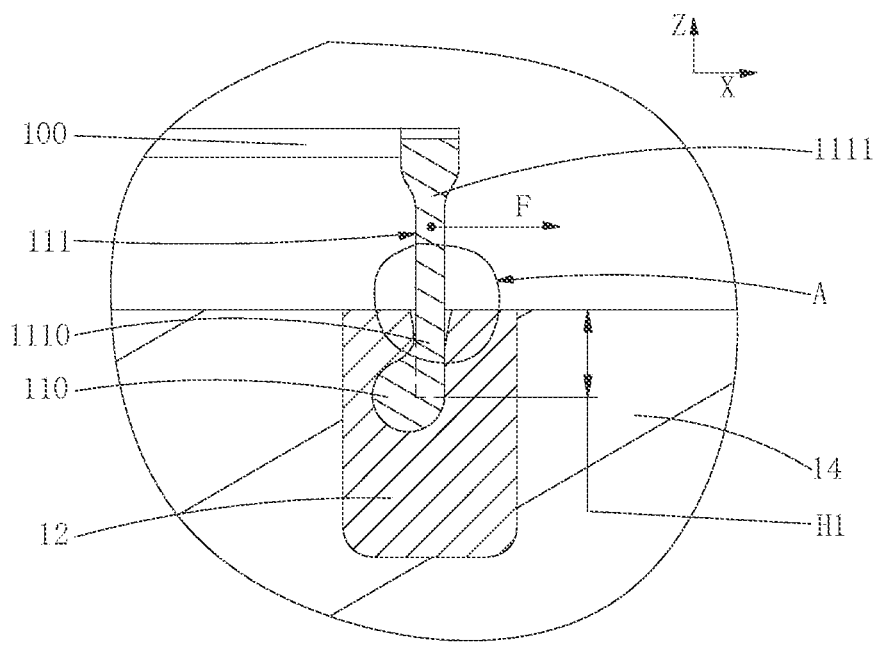
FIG. 2 is an enlarged diagram of a partial cross section of a damper device according to one embodiment of the present disclosure.
Figure 5:
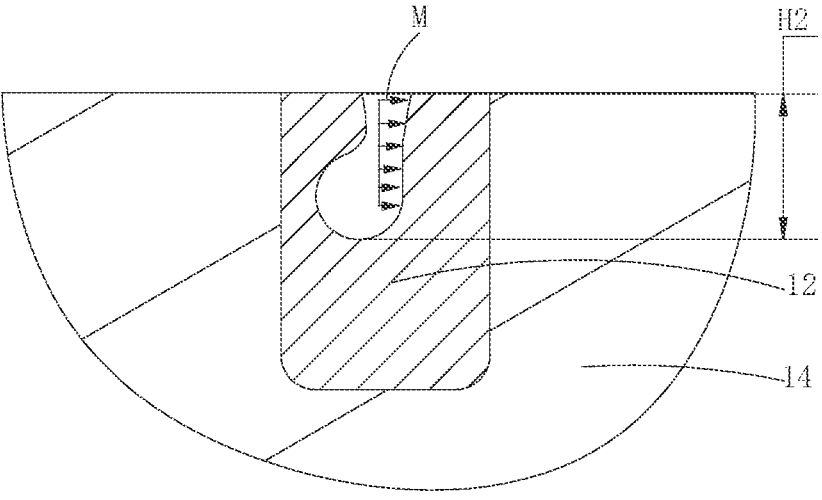
FIG. 5 is a force analysis diagram of a first gel according to one embodiment of the present disclosure (FIG. 5 is a FIG. 2 without a first damper component).

Please refer to FIG. 2 and FIG. 5, after one part of first damper component 11 is inserted into the first gel 12, under interaction of external force F (the external force F may be generated when the damper device 1 (the damper device 1 may refer to FIG. 1, similarly hereinafter) encounters shaking, and for example, when a camera shoots, the shaking could be generated and transmitted to the damper device 1 in the voice coil motor), distributed torque M would be generated on the first gel 12. In other words, the number of the torques M interacting with the first gel 12 may be considered to be multiple and the value order of the multiple torques M is decreased from the top of the one part of the first damper component 11 inserted into the first gel 12 to the bottom of the one part of the first damper component 11 inserted into the first gel 12. Under the interaction of the distributed torque M for many times, a gap would be generated between the first damper component 11 and the first gel 12 and the width of the gap is decreased from the top of the one part of the first damper component 11 inserted into the first gel 12 to the bottom of the one part of the first damper component 11 inserted into the first gel 12. For example, the depth of the gap between the first damper component 11 and the first gel 12 is denoted as D. The depth of the first damper component 11 inserted into the first gel 12 is denoted as H2.

As shown in FIG. 2, the first surface 1100 (the first surface 1100 may refer to FIG. 1, similarly hereinafter) protrudes outward from the first free end 1110, and the first protrusion part 110 may be regarded as the protrusion of the straight damping pin in the related art protruding outward along the radial direction and the axial direction of the straight damping pin. For example, after the straight damping pin in the related art is inserted into the first gel 12 at a depth H1, the straight damping pin may further extend outward to form the first protrusion part 110 (the dotted line part in FIG. 2 may be regarded as one part of the straight damping pin in the related art, and the extension part of the dotted line part in FIG. 2 may form the first protrusion part 110), and in other words, a depth H2 is the sum of the depth H1 and the height of the first protrusion part 110 along z-axis. Because of the first surface 1100 protruding outward from the first free end 1110 in the present disclosure, the contact area of the first damper component 11 and the first gel 12 would be greater than the contact area between the straight damping pin in the related art and the first gel 12. Hereby, under the same interaction of the distributed torque M with the damper device 1 for many times, the depth D (the depth D may refer to FIG. 3) of the gap between the first damper component 11 (the first damper component 11 may refer to FIG. 1) with the first protrusion part 110 and the first gel 12 would be less than the depth of the gap between the straight damping pin in the related art and the first gel 12.

Figure 3:
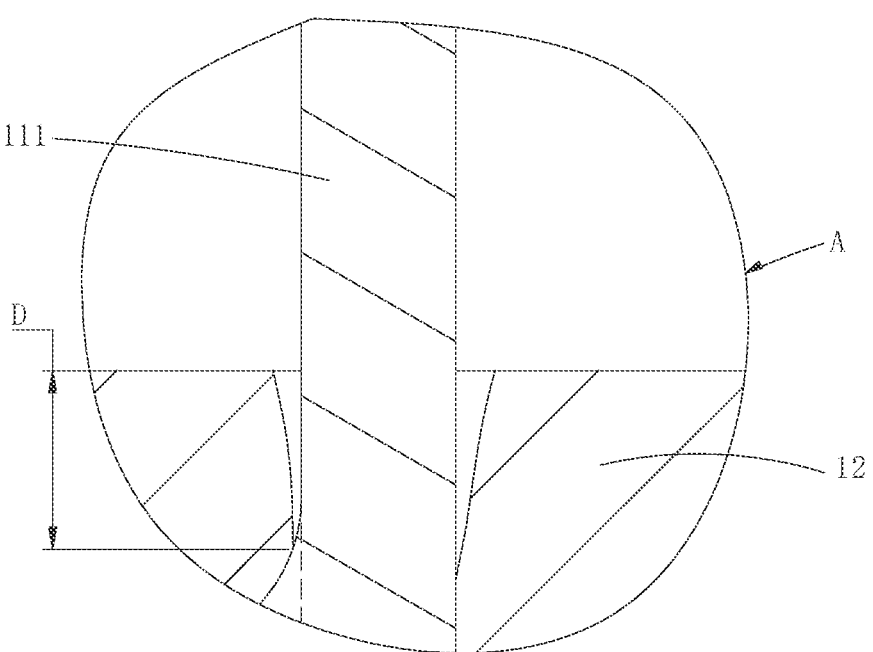
FIG. 3 is an enlarged diagram of A in FIG. 2 according to one embodiment of the present disclosure.
Figure 4:
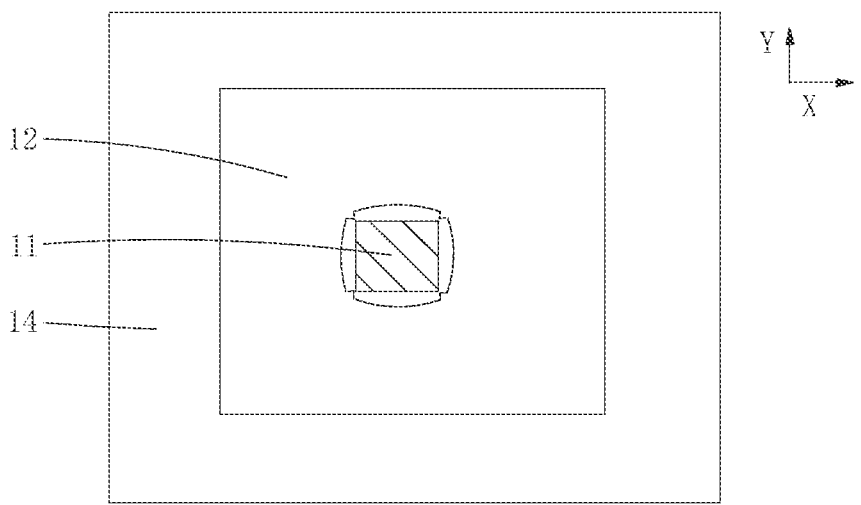
FIG. 4 is a top view diagram of a first damper component in a first gel according to one embodiment of the present disclosure (FIG. 4 is the top view diagram of FIG. 2, wherein a first damper component is cut off and a partial first motion component is shown).

As shown in FIG. 3, the depth D of the gap between the first damper component 11 (the first damper component 11 may refer to FIG. 1, similarly hereinafter) and the first gel 12 is smaller and smaller, and the remaining contact area between the first damper component 11 and the first gel 12 is larger and larger (before the depth D of the gap is generated, there is an original contact area between the first damper component 11 and the first gel 12; because of the generation of the depth D of the gap, the contact area between the first damper component 11 and the first gel 12 could be reduced, and the reduced contact area between the first damper component 11 and the first gel 12 is the remaining contact area). Because the bonding force of the first damper component 11 and the first gel 12 is positively related ro the contact area of the first damper component 11 and the first gel 12, the remaining contact area between the first damper component 11 and the first gel 12 is larger and larger, and the bonding force of the first damper component 11 and the first gel 12 is larger and larger. Hence, after the first damper component 11 moves for many times, the bonding force of the first damper component 11 and the first gel 12 is greater than the bonding force of the straight damping pin in the related art and the first gel 12.

As shown in FIG. 1, the present disclosure discloses: the first holder 10, the first damper component 11 and the first gel 12. The first damper component 11 includes the first protrusion part 110 and the first bar part 111. The first protrusion part 110 includes the first surface 1100. The first bar part 111 includes the first free end 1110 and the first fixed end 1111. The first protrusion part 110 is fixed on the first free end 1110, the first fixed end 1111 is fixed on the first holder 10 and the first surface 1100 protrudes outward from the first free end 1110. The first free end 1110 and the first protrusion part 110 are inserted into the first gel 12, and the first gel 12 moves along the radial direction of the first bar 111 part relative to the first bar part 111. Because the first free end 1110 and the first protrusion part 110 are inserted into the first gel 12 and may move in the first gel 12 and the first fixed end 1111 is fixed on the first holder 10, the first damper component 11 generates the distributed torque M (the distributed torque M may refer to FIG. 5) rotating the bottom of the first free end 110 on the first gel 12 when the first gel 12 moves along the radial direction of the first bar part 111 relative to the first bar part 111.

As shown in FIG. 1, in comparison with the straight damping pin without the first surface 1100, the contact area of the first surface 1100 and the first gel 12 is increased so that the total contact area of the first damper component 11 and the first gel 12 is larger. Hence, under the same interaction of the distributed torque M (the distributed torque M may refer to FIG. 5), the depth D (the depth D may refer to FIG. 3) of the gap generated between the first damper component 11 and the first gel 12 would be smaller so that the reduction of the bonding force between the first damper component 11 and the first gel 12 would be reduced (because the reduction of the remaining contact area between the first damper component 11 and the first gel 12 is small, the reduction of the bonding force of the first damper component 11 and the first gel 12 is small) and the first damper component 11 is not easily detached from the first gel 12.

As shown in FIG. 1, because the first surface 1100 protrudes outward from the first free end 1110, the radial size of the first protrusion part 110 would be greater than the radial size of the first bar part 111 and it is difficult for the first protrusion part 110 to pass through an accommodation space formed by the gap between the first bar part 111 and the first gel 12 along the axial direction of the first bar part 111. For example, the accommodation space formed by the gap between the first bar part 111 and the first gel 12 is a conical surface with a top surface wider than a bottom surface. The radial size of the first protrusion part 110 on the conical surface is greater than the diameter of the conical surface, and thus, it is difficult for the first protrusion part 110 to pass through the conical surface along the axial direction of the first bar part 111.

As shown in FIG. 1, optionally, the shape of the first protrusion part 110 may be a column. For example, the first protrusion part 110 may be a cylinder, a column or a column of which a side surface is a plane or a curved surface. When the shape of the first protrusion part 110 is the column, the sum of the side surface of the first protrusion part 110 and the region at the end surface of the first protrusion part 110 greater than the side plane at the tail end of the first bar part 111 (the region of the first protrusion part 110 greater than the side surface at the tail end of the first bar part 111 may refer to the part outside the dotted line in FIG. 2) is the first surface 1100. When the first protrusion part 110 is the sphere, the first surface 1100 is a spherical surface of the first protrusion part 110. When the shape of the first protrusion part 110 is the column (i.e., the first protrusion part 110 does not have sharp edges), the first gel 12 could not be broken and the bonding force between the first protrusion part 110 and the first gel 12 could not be reduced when the first protrusion part 110 undergoes the external force F to rotate the tail end of the first protrusion part 110.

As shown in FIG. 1, optionally, the side surface of the first protrusion part 110 is fixed on the first free end 1110. For example, the first free end 1110 may be located on the tail end of the first bar part 111, and in other words, the side surface of the first protrusion part 110 may be fixed on the tail end of the first bar part 111. When the shape of the first protrusion part 110 is the cylinder, the upper part of the cylindrical side surface of the first protrusion part 110 may be fixed on the first free end 1110. According to the above description, the value order of the distributed torque M (the distributed torque M may refer to FIG. 5, similarly hereinafter) interacting with the first gel 12 is decreased from the top of the one part of the first damper component 11 to the bottom of the one part of the first damper component 11, and the depth of the gap of the first protrusion part 110 generated in the first gel 12 is smaller and smaller when the position of the first protrusion part 110 is closer and closer to the first free end 1110 (for example, if the first protrusion part 110 is not fixed on the first free end 1110 and is fixed on the upper position of the first free end 1110, the depth of the gap of the first protrusion part 110 generated in the first gel 12 is greater and greater because the distributed torque M is higher and higher when the position of the first protrusion part 110 is upper and upper). Hence, the side surface of the first protrusion part 110 is fixed on the free end of the first bar part 111 and it is beneficial to reduce the depth of the gap between the first protrusion part 110 and the first gel 12, thereby decreasing the reduction of the contact area between the first protrusion part 110 and the first gel 12.

As shown in FIG. 1, optionally, the first bar part 111 includes two side planes, and the two end surfaces of the first protrusion part 110 and the two side planes of the first bar part 111 are disposed with coplanarity. For example, when the shape of the first bar part 111 is a cuboid, the front side plane and the rear side plane of the first bar part 111 and the two end surfaces of the first protrusion part 110 are disposed with coplanarity. When the shape of the first protrusion part 110 is a cylinder, the front plane and the rear plane of the first protrusion part 110 are end surfaces.

As shown in FIG. 1, in comparison with that the end surface of the first protrusion part 110 is higher than the side plane of the first bar part 111, the two end surfaces of the first protrusion part 110 and the two side planes of the first bar part 111 are disposed with coplanarity and it may prevent the end surface of the first protrusion part 110 from squeezing the first gel 12 to form the gap when the end surface of the first protrusion part 110 moves along the axial direction of the first bar part 111 under extreme situations (e.g., when the damper device 1 falls down). Because the end surface of the first protrusion part 110 would not squeeze the first gel 12 to form the gap when the end surface of the first protrusion part 110 moves along the axial direction of the first bar part 111, the side plane of the first bar part 111 close to the section of the first free end 1110 and coplanar with the end surface of the first protrusion part 110 may keep contacting the first gel 12 when the end surface of the first protrusion part 110 moves along the axial direction of the first bar part 111.

As shown in FIG. 1, optionally, the area of the end surface of the first protrusion part 110 on one side of the first bar part 111 is greater than the area of the end surface of the first protrusion part 110 on another side of the first bar part 111. For example, viewing from the middle plane of the first bar part 111 (the middle plane of the first bar part 111 is the plane coplanar with the center axial line of the first bar part 111) vertical to the end surface of the first protrusion part 110 (the end surface of the first protrusion part 110 includes a front surface of the first protrusion part 110 and a rear surface of the first protrusion part 110, similarly hereinafter), the area of the end surface of the first protrusion part 110 on the left side of the aforementioned middle plane may be greater than the area of the end surface of the first protrusion part 110 on the right side of the aforementioned middle plane.

Figure 6:
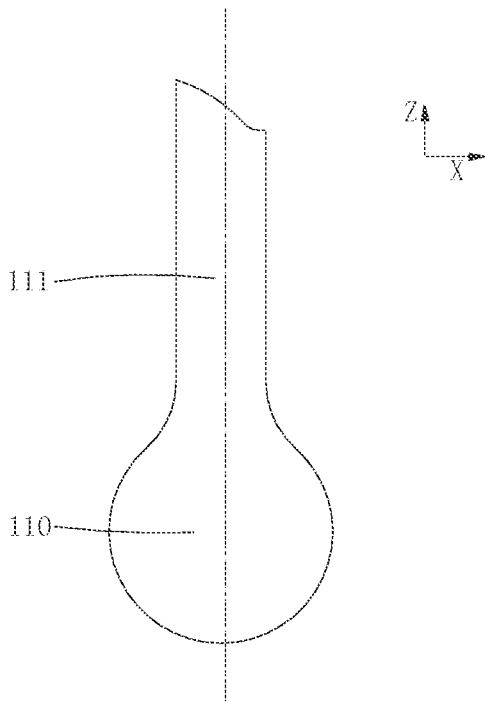
FIG. 6 is a partial front view diagram of a first damper component according to another embodiment of the present disclosure.

As shown in FIG. 6, in another embodiment, the area of the end surface of the first protrusion part 110 on one side of the first bar part 111 is equal to the area of the end surface of the first protrusion part 110 on another side of the first bar part 111. Similarly, the area of the end surface of the first protrusion part 110 on the left side of the aforementioned middle plane may be equal to the area of the end surface of the first protrusion part 110 on the right side of the aforementioned middle plane.

Figure 7:
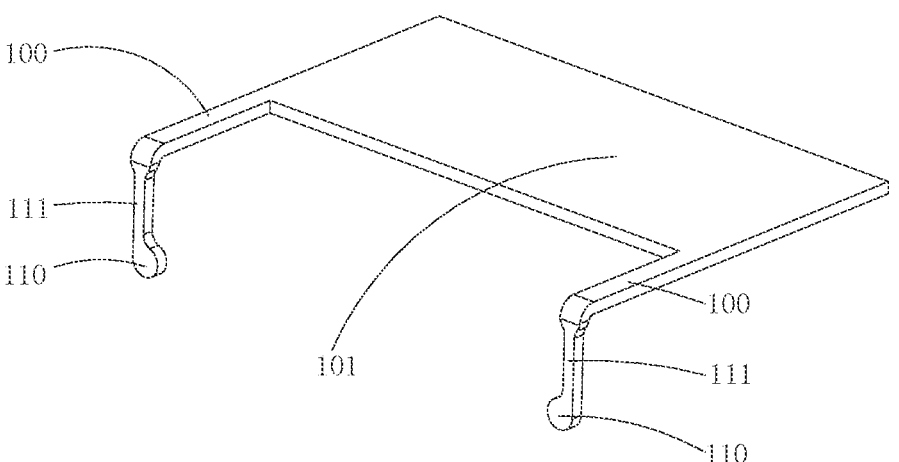
FIG. 7 is a 3D diagram of a first holder according to one embodiment of the present disclosure.

As shown in FIG. 7, optionally, the first holder 10 (the first holder may refer to FIG. 1) includes a first supporting bar 100 and a first supporting plate 101. One end of the first supporting bar 100 is fixed on the first supporting plate 101 and the first fixed end 1111 (the first fixed end 1111 may refer to FIG. 1, similarly hereinafter) is fixed on another end of first supporting bar 100. The shape of the first supporting bar 100 may be a long rectangular parallelepiped or a cylinder. The shape of the first supporting plate 101 may be a cuboid sheet. The first supporting bar 100 may be vertically disposed with the first supporting plate 101. The original end of the first supporting bar 100 may be fixed on one side of the first supporting plate 101, and the first fixed end 1111 may be fixed on the tail end of the first supporting bar 100. The first supporting bar 100, the first supporting plate 101 and the first bar part 111 may be fixed to each other by soldering or one-piece molding. The contact area of the sheetlike first supporting plate 101 and the first frame 13 (the first frame 13 may refer to FIG. 1, similarly hereinafter) may be increased so that the first damper component 11 (the first damper component 11 may refer to FIG. 1) is more stably fixed on the first frame 13.

As shown in FIG. 7, optionally, the number of the first supporting bars 100 is two, and the two first supporting bars 100 are fixed on the first supporting plate 101. The two first supporting bars 100 are fixed on the first supporting plate 101, and thus the two first supporting bars 100 are fixed as the first supporting plate 101 is fixed completely, and there is no need to fix the two first supporting bars 100 one by one and it is convenient for the two first supporting bars 100 to fix. The two first supporting bars 100 may be disposed in parallel with each other. The two first supporting bars 100 may be disposed on the same side of the first supporting plate 101. The first damper component 11 (the first damper component 11 may refer to FIG. 1), the first supporting bar 100 and the first supporting plate 101 may be integrally formed by stamping.

As shown in FIG. 7, optionally, the number of the first bar parts 111 is two and the number of the first protrusion parts 100 is two. Each of the two first supporting bars 100 corresponds to one of the two first bar parts 111 and is fixed on the corresponding first bar part 111, and each of the two first bar parts 111 corresponds to one of the two first protrusion parts 110 and is fixed on the corresponding first protrusion parts 110. The two first bar parts 111 are disposed in parallel with each other, and the two end surfaces of the two first protrusion part 110 are disposed with coplanarity. The first supporting bar 100 and the first bar part 111 may be vertically disposed. The two first bar parts 111 disposed in parallel with each other may be that the center axial lines of the two first bar parts 111 are disposed in parallel with each other. The front-end surface of the first protrusion part 110 of each of the two first holders 10 (the first holder 10 may refer to FIG. 1, similarly hereinafter) may be disposed with coplanarity. The rear end surface of the first protrusion part 110 of each of the two first holders 10 may be disposed with coplanarity.

As shown in FIG. 7, optionally, the two first bar parts 111 are disposed in parallel with each other, and the two end surfaces of the two first protrusion parts 110 are disposed with coplanarity. When the external force F (the external force F may refer to FIG. 2, similarly hereinafter) interacts with the two first damper components 11 (the first damper components 11 may refer to FIG. 1, similarly hereinafter) along the direction vertical to the center axial line of the two first bar part 111, a turning moment would not be generated (for example, if the two first bar parts 111 are separately disposed and the direction of the external force F keeps constant, the external force F would generate the turning moment by regarding the center axial line of one of the two first bar parts 111 as the center of the moment). The external force F would not generate the turning moment rotating the center axial line of one of the two first bar parts 111, and the depth D (the depth D may refer to FIG. 3) of the gap between the first damper component 11 and the first gel 12 would not be increased due to the turning moment.

Figure 8:
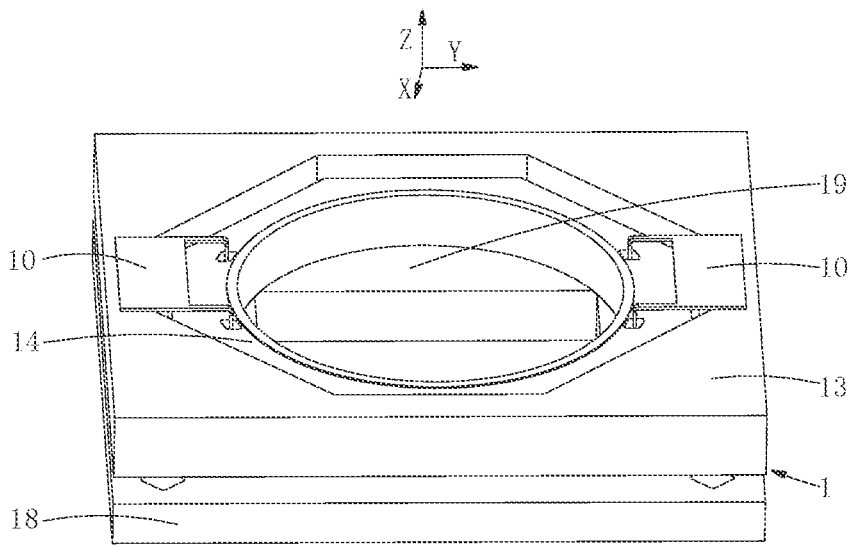
FIG. 8 is a 3D diagram of a damper device according to one embodiment of the present disclosure.

As shown in FIG. 8, optionally, the damper device 1 further includes a first frame 13 and a first motion component 14. The first motion component 14 moves along the radial direction of the first bar part 111 (the first bar part 111 may refer to FIG. 7) relative to the first frame 13, the first holder 10 is fixed on the first frame 13 and the first gel 12 (the first gel 12 may refer to FIG. 1, similarly hereinafter) is disposed on the first motion component 14. The first frame 13 may be a cuboid frame with a top surface connected to a bottom surface. The first motion component 14 may be a polygonal frame with a top surface connected to a bottom surface. The first motion component 14 may be embedded in the center of the first frame 13. The first motion component 14 may move along x-axis or y-axis relative to the first frame 13, thereby driving the first gel 12 to move along x-axis or y-axis. The number of the first gels corresponds to the number of the first damper component 11 (the first damper component 11 may refer to FIG. 1).

As shown in FIG. 8, optionally, the number of the first holders 10 is two, and the first motion component 14 is disposed between the two first holders 10. The two first holders 10 may be fixed on two sides of the first frame 13, and the first supporting plate 101 (the first supporting plate 101 may refer to FIG. 7, similarly hereinafter) of each of the two first holders 10 may be disposed in parallel with each other. For example, the first supporting plates 101 of the two first holders 10 may be located on the middle position on the left side of the first frame 13 and the middle position on the right side of the first frame 13.

Figure 9:
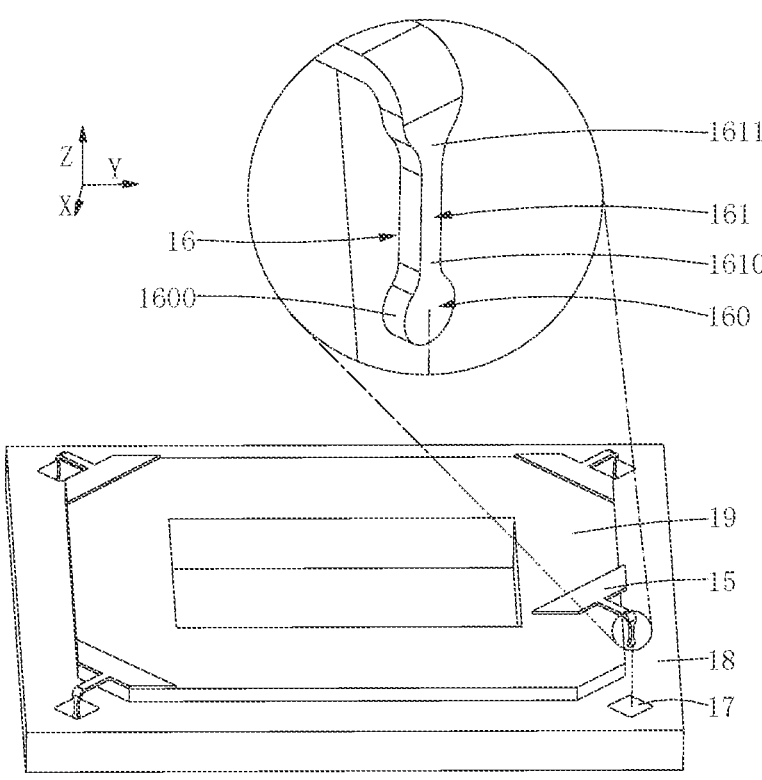
FIG. 9 is a 3D diagram and a partial enlarged diagram of a damper device according to one embodiment of the present disclosure (a second damper component, a second gel, a second motion component, a second frame and a second holder are merely shown; wherein, one second holder is on a separate state).

As shown in FIG. 9, optionally, the damper device 1 (the damper device 1 may refer to FIG. 8) further includes a second holder 15, a second damper component 16 and a second gel 17. The second damper component 16 includes a second protrusion part 160 and a second bar part 161. The second protrusion part 160 includes a second surface 1600. The second bar part 161 includes a second free end 1610 and a second fixed end 1611. The second protrusion part 160 is fixed on the second free end 1610, the second fixed end 1611 is fixed on the second holder 15, and the second surface 1600 protrudes outward from the second free end 1610. The second free end 1610 and the second protrusion part 160 are inserted into the second gel 17, and the second bar part 161 moves along the radial direction of the second bar part 161 relative to the second gel 17.

As shown in FIG. 9, the size and the shape of the second damper component 16 and the size and the shape of the first damper component 11 (the first damper components 11 may refer to FIG. 1, similarly hereinafter) are the same. The materials of the second gel 17 and the materials of the first gel 12 (the first gel 12 may refer to FIG. 1, similarly hereinafter) are the same. In other words, the principle of the second damper component 16 and the second gel 17 and the principle of the first damper component 11 and the first gel 12 are the same. The second bar part 161 may move along a direction parallel to x-axis or y-axis relative the second gel 17. The first gel 12 and the second gel 17 may be semi-solid.

As shown in FIG. 9, optionally, the damper device 1 (the damper device 1 may refer to FIG. 1) further includes a second frame 18 and a second motion component 19. The second motion component 19 moves along the radial direction of the second bar part 161 relative to the second frame 18, the second gel 17 is disposed on the second frame 18, and the second holder 15 is fixed on the second motion component 19. The second frame 18 and the second motion component 19 may be cuboid frames with top surfaces connected to bottom surfaces, and the part of the second motion component 19 may be embedded in the center of the second frame 18. The second motion component 19 may be located right below the first motion component 14 (the first motion component 14 may refer to FIG. 8). The second frame 18 may be located right below the first frame 13 (the first frame 13 may refer to FIG. 8). The number of the second damper components 16, the number of the second holders 15 and the number of the second gels may be four. The second damper components 16, the second holders 15 and the second gels 17 may be disposed one by one. The four second holders 15 may be fixed on the four corners of the second motion component 19, and the four second gels 17 may be disposed on the four corners of the second frame 18.

Figure 10:
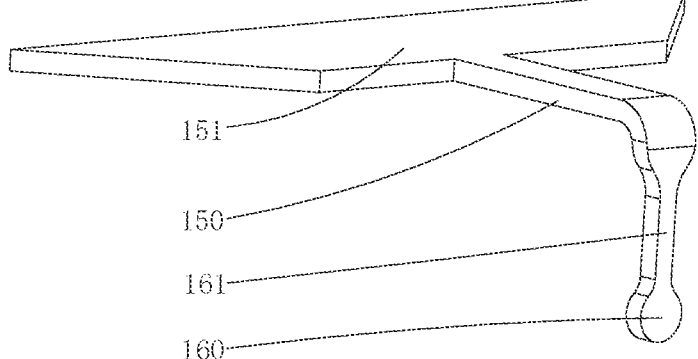
FIG. 10 is a 3D diagram of a second holder according to one embodiment of the present disclosure.

As shown in FIG. 10, optionally, the second holder 15 (the second holder 15 may refer to FIG. 9, similarly hereinafter) includes a second supporting bar 150 and a second supporting plate 151. One end of the second supporting bar 150 is fixed on the second supporting plate 151, the second fixed end 1611 (the second fixed end 1611 may refer to FIG. 9, similarly hereinafter) is fixed on another end of the second supporting bar 150. The second supporting bar 150, the second supporting plate 151 and the second damper component 16 (the second damper component 16 may refer to FIG. 9, similarly hereinafter) may be fixed to each other by soldering or one-piece molding. The shape of the second supporting bar 150 may a long rectangular parallelepiped or a cylinder. The second supporting plate 151 may be a trapezoid sheet. The original end of the second supporting bar 150 may be fixed on the middle position of the short side of the trapezoid second supporting plate 151, and the second fixed end 1611 may fixed on the tail end of the second supporting bar 150. The contact area between the sheetlike second supporting plate 151 and the second motion component 19 (the second motion component 19 may refer to FIG. 9, similarly hereinafter) may be increased so that the second damper component 16 is more stably fixed on the second motion component 19.

Figure 11:
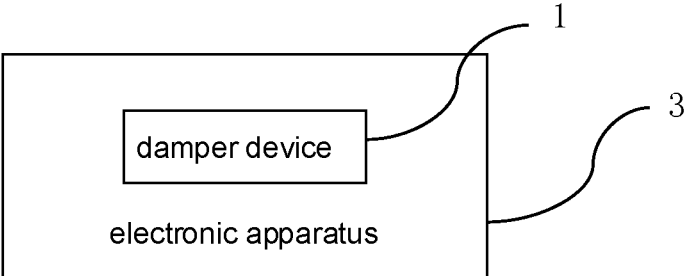
FIG. 11 is a block diagram of an electronic apparatus according to yet another embodiment of the present disclosure.

As shown in FIG. 11, the present disclosure in yet another embodiment provides an electronic apparatus 3 including the damper device 1 in the aforementioned embodiment. The damper device 1 may be one part of the micro motion mechanism (e.g., voice coil motor), and the micro motion mechanism may be one part of the electronic apparatus 3. For example, the electronic apparatus 3 may be an intelligent mobile phone, an intelligent television, a digital camera, a dashcam, a wearable device, etc.

The damper device and the electronic apparatus provided by the embodiments of the present disclosure are described in detail by the above description. The person skilled in the art would have changes in specific implementation and application scope according to the idea of the embodiments of the present disclosure. In view of the above description, the content of the present disclosure should not be construed as limitations of the present disclosure, and equivalent modification or changes according to the idea and the spirit of the present disclosure should be construed as being included within the claims of the present disclosure.

LIST OF REFERENCE SIGNS

1: damper device
10: first holder
100: first supporting bar
101: first supporting plate
11: first damper component
110: first protrusion part
1100: first surface
111: first bar part
1110: first free end
1111: first fixed end
12: first gel
13: first frame
14: first motion component
15: second holder
150: second supporting bar
151: second supporting plate
16: second damper component
160: second protrusion part
1600: second surface
161: second bar part
1610: second free end
1611: second fixed end
17: second gel
18: second frame

19: second motion component
3: electronic apparatus
D: the depth of the gap between the first damper component and the first gel
F: external force
M: torque
H1: the depth of the straight damping pin inserted into the first gel
H2: the depth of first damper component inserted into the first gel

The invention claimed is:

1. A damper device comprising:
a first holder;
a first damper component comprising:
  a first protrusion part comprising a first surface; and
  a first bar part comprising a first fixed end fixed on the first holder and a first free end on which the first protrusion part is fixed, wherein the first surface protrudes outward from the first free end; and
a first gel into which the first free end and the first protrusion part are inserted, wherein, the first gel moves along a radial direction of the first bar part relative to the first bar part.

2. The damper device according to claim 1, wherein a shape of the first protrusion part is a column.

3. The damper device according to claim 2, wherein a side surface of the first protrusion part is fixed on the first free end.

4. The damper device according to claim 3, wherein the first bar part comprises two side planes, and two end surfaces of the first protrusion part and the two side planes of the first bar part are disposed with coplanarity.

5. The damper device according to claim 3, wherein an area of the end surface of the first protrusion part on one side of the first bar part is greater than an area of the end surface of the first protrusion part on another side of the first bar part.

6. The damper device according to claim 3, wherein an area of the end surface of the first protrusion part on one side of the first bar part is equal to an area of the end surface of the first protrusion part on another side of the first bar part.

7. The damper device according to claim 2, wherein the first holder comprises a first supporting bar and a first supporting plate, one end of the first supporting bar is fixed on the first supporting plate and the first fixed end is fixed on another end of first supporting bar.

8. The damper device according to claim 7, wherein the number of the first supporting bars is two, and the two first supporting bars are fixed on the first supporting plate.

9. The damper device according to claim 8, wherein the number of the first bar parts is two and the two first bar parts are disposed in parallel with each other, the number of the first protrusion parts is two and two end surfaces of the two first protrusion parts are disposed with coplanarity, each of the two first supporting bars corresponds to one of the two first bar parts and is fixed on the corresponding first bar part, and each of the two first bar parts corresponds to one of the two first protrusion parts and is fixed on the corresponding first protrusion part.

10. The damper device according to claim 1, wherein the damper device further comprises a first frame and a first motion component, the first motion component moves along a radial direction of the first bar part relative to the first frame, the first holder is fixed on the first frame, and the first gel is disposed on the first motion component.

11. The damper device according to claim 10, wherein the number of the first holders is two, and the first motion component is disposed between the two first holders.

12. The damper device according to claim 1, further comprising:

a second holder;

a second damper component comprising:

a second protrusion part comprising a second surface; and a second bar part comprising a second fixed end fixed on the second holder and a second free end on which the second protrusion part is fixed, wherein the second surface protrudes outward from the second free end; and a second gel into which the second free end and the second protrusion part are inserted, wherein, the second bar part moves along a radial direction of the second bar part relative to the second gel.

13. The damper device according to claim 12, wherein the second holder comprises a second supporting bar and a second supporting plate, one end of the second supporting bar is fixed on the second supporting plate and the second fixed end is fixed on another end of second supporting bar.

14. The damper device according to claim 13, wherein the damper device further comprises a second frame and a second motion component, the second motion component moves along the radial direction of the second bar part relative to the second frame, the second holder is fixed on the second motion component, and the second gel is disposed on the second frame.

15. An electronic apparatus comprising the damper device according to claim 1.

* * * * *